United States Patent
Cho et al.

(10) Patent No.: US 7,551,696 B2
(45) Date of Patent: Jun. 23, 2009

(54) METHOD AND APPARATUS OF DETECTING ISI/ICSI IN AN OFDM SYSTEM

(75) Inventors: Chun-Ming Cho, Chi-Lung (TW); Kuang-Yu Yen, Tai-Chung (TW)

(73) Assignee: Realtek Semiconductor Corp., HsinChu (TW)

(*) Notice: Subject to any disclaimer, the term of this patent is extended or adjusted under 35 U.S.C. 154(b) by 632 days.

(21) Appl. No.: 10/710,539

(22) Filed: Jul. 20, 2004

(65) Prior Publication Data

US 2006/0018390 A1    Jan. 26, 2006

(51) Int. Cl.
    *H04L 27/06* (2006.01)
(52) U.S. Cl. ............... 375/343; 375/344; 375/345; 375/348; 375/355
(58) Field of Classification Search ......... 375/146–148, 375/142, 144, 150, 348, 260, 316, 340, 342–344, 375/355; 370/208
    See application file for complete search history.

(56) References Cited

U.S. PATENT DOCUMENTS

| | | | |
|---|---|---|---|
| 6,438,183 B1 * | 8/2002 | Taura et al. | 375/343 |
| 6,438,367 B1 | 8/2002 | Crawford | |
| 6,690,739 B1 * | 2/2004 | Mui | 375/265 |
| 6,990,156 B2 | 1/2006 | Chen | |
| 7,020,116 B1 * | 3/2006 | Nakada | 370/338 |
| 7,042,930 B2 * | 5/2006 | Dafesh | 375/149 |
| 7,136,436 B2 * | 11/2006 | Gummadi et al. | 375/342 |
| 7,151,792 B2 * | 12/2006 | Shimizu et al. | 375/148 |
| 7,218,691 B1 * | 5/2007 | Narasimhan | 375/344 |
| 7,227,834 B1 * | 6/2007 | Barton et al. | 370/208 |

(Continued)

FOREIGN PATENT DOCUMENTS

WO    0225857 A1    3/2002

OTHER PUBLICATIONS

Konstantinos Nikitopoulos, Andreas Polydoros; "Post-FFT Fine Frame Synchronization for OFDM systems";National and Capodistrian University of Athens, Dept. of Physics, Electronics Laboratory, 157 84 Panepistimiopolis, Athens, Greece.
Michael Speth, et al.;"Optimum Receiver Design for OFDM-Based Broadband Transmission-Part 2: A Case Study";IEEE Transactions on Communications, vol. 49, No. 4, Apr. 2001.

*Primary Examiner*—Shuwang Liu
*Assistant Examiner*—Hirdepal Singh
(74) *Attorney, Agent, or Firm*—Winston Hsu

(57) ABSTRACT

A method for detecting inter-symbol interference (ISI) in an OFDM system includes the steps of computing a first correlation value representing the correlation between a plurality of first signals of a first symbol and a plurality of second signals of a second symbol previous to the first symbol, wherein the first and the second signals are both transmitted via the same sub-carriers; computing a second correlation value representing the correlation between the first signals and a plurality of third signals of a third symbol next to the first symbol, wherein the first and the third signals are both transmitted via the same sub-carriers; comparing the first correlation value with the second correlation value; and adjusting the timing of the boundary according to the comparison result.

17 Claims, 3 Drawing Sheets

U.S. PATENT DOCUMENTS

| | | |
|---|---|---|
| 7,257,175 B2 * | 8/2007 | Chen et al. ................... 375/343 |
| 7,391,828 B2 * | 6/2008 | Liu et al. ..................... 375/342 |
| 2002/0021771 A1 | 2/2002 | Pozidis |
| 2003/0090994 A1 | 5/2003 | Kakura |
| 2003/0179698 A1 | 9/2003 | Lu |
| 2005/0084025 A1 * | 4/2005 | Chen ........................... 375/260 |
| 2005/0135432 A1 | 6/2005 | Kelley |
| 2005/0152317 A1 * | 7/2005 | Awater et al. ................ 370/338 |
| 2005/0276340 A1 | 12/2005 | Chow |
| 2007/0053281 A1 * | 3/2007 | Schwoerer ................... 370/208 |

* cited by examiner

US 7,551,696 B2

METHOD AND APPARATUS OF DETECTING ISI/ICSI IN AN OFDM SYSTEM

CROSS REFERENCE TO RELATED APPLICATIONS

This is a co-pending application Ser. No. 10/710,541, filed on the same day with the present patent application, entitled "METHOD AND APPARATUS OF DETECTING ISI/ICSI IN AN OFDM SYSTEM" and assigned to the same assignee, the contents of which are incorporated herein by reference.

BACKGROUND OF INVENTION

1. Field of the Invention

The invention relates to an apparatus for use in an OFDM system and a method thereof, and more particularly, to an apparatus for detecting ISI/ICSI in an OFDM system and a method thereof.

2. Description of the Prior Art

Most OFDM transceivers suffer from well-known problems of inter-symbol interference (ISI) and inter-carrier interference (ICI). An additional guard interval (GI) is added between two symbols to recover the ISI and the ICI. When receiving a packet including a plurality of symbols, a conventional OFDM receiver detects the boundary of each symbol, removes GI of each symbol according to the detected boundary of the symbol, and then demodulated the symbol through Fast Fourier Transform (FFT) operation. However the detected boundary may not be reliable owing to the influence of multi-path and other factors.

One conventional art applied to improve the precision of boundary detection is to estimate the time shift of the detected boundary according to the frequency domain linear phase shift of the demodulated data. Another conventional art disclosed is to estimate the time shift of the detected boundary according to the channel impulse response of the symbol. However, when the delay spread phenomenon is too severe, the ISI and ICI problem cannot be recovered by both of the two conventional techniques and the boundary detection may be imprecise which may cause divergence or even failure in receiving when receiving symbols.

SUMMARY OF INVENTION

It is therefore one of the objects of the claimed invention to provide a method and an apparatus of detecting ISI/ICSI in an OFDM system for use in boundary tracking to solve the above-mentioned problem.

According to an embodiment of the claimed invention, a method of detecting inter-symbol interference (ISI) of a symbol for adjusting a boundary of the symbol utilized by an OFDM system is disclosed. Each symbol includes a plurality of signals respectively transmitting via a plurality of sub-carriers. The disclosed method comprises the steps of computing a first correlation value representing the correlation between a plurality of first signals of a first symbol and a plurality of second signals of a second symbol previous to the first symbol, wherein the first and the second signals are both transmitted via the same sub-carriers; computing a second correlation value representing the correlation between the first signals and a plurality of third signals of a third symbol next to the first symbol, wherein the first and the third signals are both transmitted via the same sub-carriers; comparing the first correlation value with the second correlation value; and adjusting the timing of the boundary according to the comparison result.

According to an embodiment of the claimed invention, an apparatus of detecting inter-symbol interference (ISI) of a symbol for adjusting a boundary of the symbol utilized by an OFDM system is disclosed. Each symbol includes a plurality of signals respectively transmitting via a plurality of sub-carriers. The disclosed apparatus comprises a first correlator for computing a first correlation value representing the correlation between a plurality of first signals of a first symbol and a plurality of second signals of a second symbol previous to the first symbol, wherein the first and the second signals are both transmitted via the same sub-carriers; a second correlator for computing a second correlation value representing the correlation between the first signals and a plurality of third symbols of a third symbol next to the first symbol, wherein the first and the third signals are both transmitted via the same sub-carriers; a comparator for comparing the first correlation value with the second correlation value; and a timing controller for adjusting the timing of the boundary according to the comparison result.

DETAILED DESCRIPTION

Figure 1:
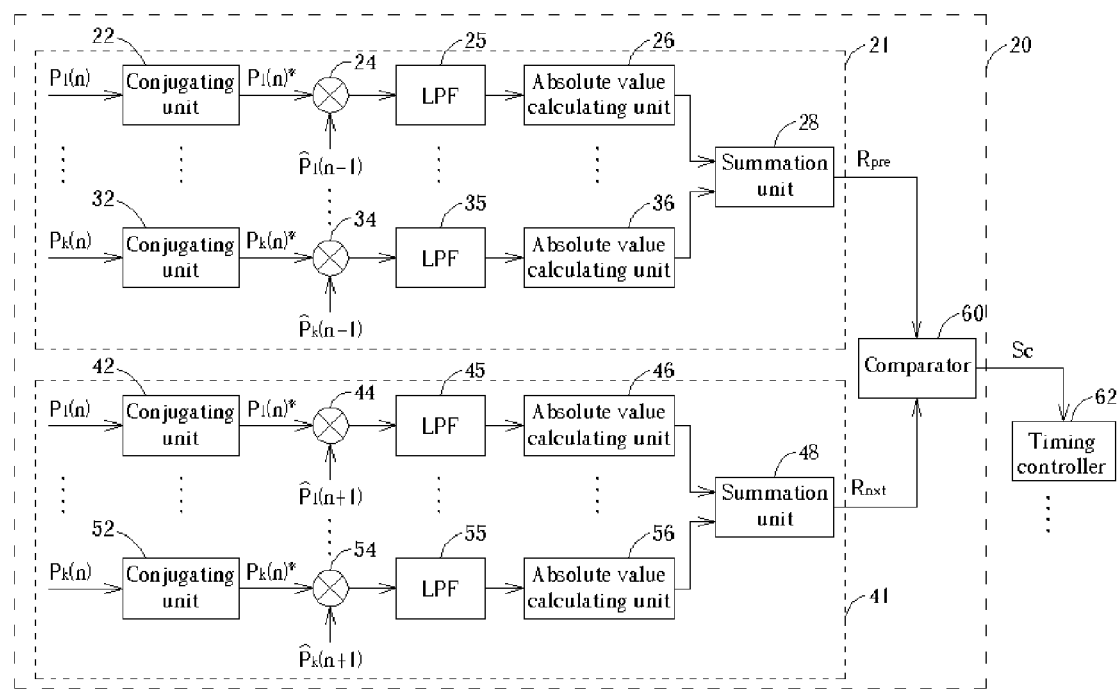
FIG. 1 is a schematic diagram of an ISI detector according to one embodiment of the present invention.

Please refer to FIG. 1, which is a schematic diagram of an ISI detector 20 according to one embodiment of the present invention. As shown in FIG. 1, the ISI detector 20 is coupled to a timing controller 62, and the ISI detector 20 comprises two correlators 21, 41 for respectively generating a correlation value $R_{pre}$ and a correlation value $R_{nxt}$ and a comparator 60 to compare both correlation values. The correlation value $R_{pre}$ represents the magnitude of the ISI caused by the previous symbol, and the correlation value $R_{nxt}$ represents the magnitude of the ISI caused by the next symbol. The comparator 60 is used to compare the correlation value $R_{pre}$ with the correlation value $R_{nxt}$ and generate a control signal Sc according to the comparison result. The timing controller 62 is used to control the timing of a boundary of an OFDM system according to the control signal Sc.

As shown in FIG. 1, the correlator 21 of this embodiment comprises conjugating units 22, ..., 32, multipliers 24, ..., 34, low-pass filters 25, ..., 35, absolute value calculating units 26, ..., 36, and a summation unit 28. The conjugating units 22, ..., 32 are used for respectively generating conjugated pilot data $P_1(n)^*, \ldots, P_k(n)^*$ by conjugating corresponding pilot data $P_1(n), \ldots, P_k(n)$ that was transmitted using the current symbol. The multipliers 24, ..., 34 are used for respectively generating product values by multiplying those conjugated pilot data $P_1(n)^*, P_k(n)^*$ with a corresponding comparison data $$\hat{P}_1(n-1)$$

$$,\ldots,$$

$$\hat{P}_k(n-1)$$

that was transmitted using the previous symbol. The low-pass filters 25, ..., 35 are used for averaging the product values outputted from these multipliers 24, 34, respectively. The absolute value calculating units 26, ..., 36 are used for generating absolute values of the average values corresponding to the product values. The summation unit 28 is used for generating a correlation value $R_{pre}$ by summing these absolute values.

Similarly, the correlator 41 comprises conjugating units 42, ..., 52, multipliers 44, ..., 54, low-pass filters 45, ..., 55, absolute value calculating units 46, ..., 56, and a summation unit 48. The conjugating units 42, ..., 52 are used for respectively generating conjugated pilot data $P_1(n)^*$, ..., $P_k(n)^*$ by conjugating corresponding pilot data $P_1(n)$, ..., $P_k(n)$ that was transmitted using a current symbol. The multipliers 44, ..., 54 are used for respectively generating product values by multiplying those conjugated pilot data $P_1(n)^*$, ..., $P_k(n)^*$ with a corresponding comparison data $\hat{P}_1(n+1)$

, ..., $\hat{P}_k(n+1)$ that was transmitted using the next symbol. The low-pass filters 45, ..., 55 are used for averaging the product values outputted from these multipliers 44, ..., 54, respectively. The absolute value calculating units 46, ..., 56 are used for generating absolute values of the average values corresponding to the product values outputted from these multipliers 44, ..., 54. The summation unit 48 is used for generating a correlation value $R_{nxt}$ by summing these absolute values.

According to the well-known theorem of correlation, the following Equations (1) and (2) are used to better explain operations of the correlators 21, 41.

$$R_{pre} = \sum_{k=1}^{K} \text{abs}\left(E\left[\hat{P}_k(n-1) \cdot P_k(n)^*\right]\right) \quad \text{Equation (1)}$$

$$R_{nxt} = \sum_{k=1}^{K} \text{abs}\left(E\left[\hat{P}_k(n+1) \cdot P_k(n)^*\right]\right) \quad \text{Equation (2)}$$

$P_k(n)^*$ denotes the conjugated pilot data transmitted using an $n^{th}$ symbol via the a $k^{th}$ sub-carrier, $\hat{P}_k(n-1)$ denotes the comparison data transmitted using an $(n-1)^{th}$ symbol via a $k^{th}$ sub-carrier, and $\hat{P}_k(n+1)$ denotes another comparison data transmitted using an $(n+1)^{th}$ symbol via a $k^{th}$ sub-carrier. Please note that the more sub-carriers that are considered, the more reliable result will be generated.

This embodiment of ISI detector is for use in the OFDM system that the pilot of different symbols transmitted via the same sub-carrier have known but different predetermined values. As the result, $\hat{P}_k(n-1)$ and $\hat{P}_k(n+1)$ denote those known predetermined values of pilot in this embodiment. Since the pilots of two different symbols are different, the correlation between pilots of different symbols is due to the interference between these two symbols. Therefore, if the correlation value $R_{pre}$ is greater than the correlation value $R_{nxt}$, it means that the interference is mainly introduced from using the previous symbol, which is due to the timing of the detected boundary is ahead of that of the ideal boundary. In this manner, the timing controller 62 delays the timing of the boundary according to the control signal Sc outputted from the comparator 60. On the otherhand, if the correlation value $R_{pre}$ is less than the correlation value $R_{nxt}$, it means that the interference is mainly introduced from the following symbol, which is due to the timing of the detected boundary lags behind that of the ideal boundary. In this manner, the comparator 60 outputs the control signal Sc to the timing controller 62 for advancing the timing of the boundary. As a result, the ISI effect is alleviated.

Figure 2:
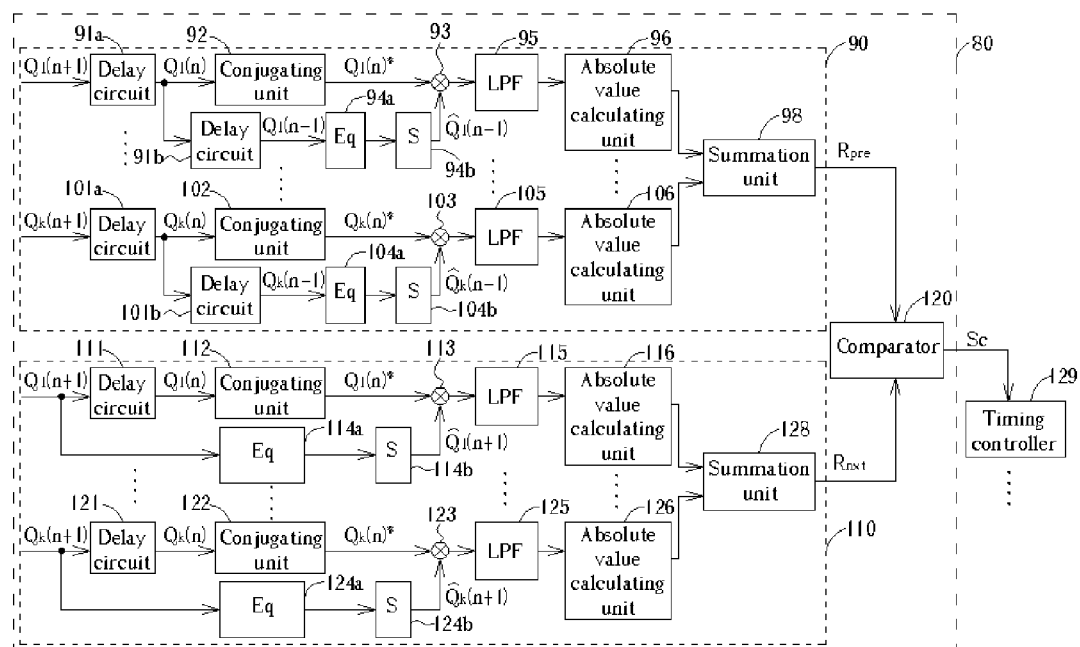
FIG. 2 is a schematic diagram of an ISI detector according to another embodiment of the present invention.

Please refer to FIG. 2, which is a schematic diagram of an ISI detector 80 according to another embodiment of the present invention. As show in FIG. 2, the ISI detector 80 comprises two correlators 90, 110 and a comparator 120. The correlators 90, 110 are used for generating correlation values $R_{pre}$ and $R_{nxt}$, respectively. The comparator 120 compares the correlation value $R_{pre}$ with the correlation value $R_{nxt}$ for outputting a control signal Sc to control the timing controller 129.

In this embodiment, the correlator 90 has $1^{st}$ delay circuits 91a, ..., 101a, $2^{nd}$ delay circuits 91b, ..., 101b, conjugating units 92, ..., 102, multipliers 93, ..., 103, equalizers 94a, ..., 104a, slicers 94b, ..., 104b, low-pass filters 95, ..., 105, absolute value calculating units 96, ..., 106, and a summation unit 98. Concerning the other correlator 110, it has $1^{st}$ delay circuits 111, ..., 121, conjugating units 112, ..., 122, multipliers 113, ..., 123, equalizers 114a, ..., 124a, slicers 114b, ..., 124b, low-pass filters 115, ..., 125, absolute value calculating units 116, ..., 126, and a summation unit 128. Please note that the components shown in FIGS. 1 and 2 that have the same name have substantially the same functionality and operation. The related description, therefore, is not repeated for simplicity.

For an OFDM system having pilot transmitted via the same pilot sub-carrier using different symbols corresponding to the same value, the ISI detector 80 is preferably utilized. As shown in FIG. 2, the comparison data $\hat{Q}_1(n-1)$

, ..., $\hat{Q}_k(n-1)$ are the decision results from received data signals $Q_1(n-1)$, ..., $Q_k(n-1)$ through the corresponding equalizers 94a, ..., 104a, and the slicers 94b, ..., 104b, wherein the data signals $Q_1(n-1)$, ..., $Q_k(n-1)$ are delayed by the corresponding $1^{st}$ delay circuits 91a, ..., 101a, $2^{nd}$ delay circuits 91b, ..., 101b and then transmitted to the equalizers 94a, ..., 104a. Regarding the comparison data signals $\hat{Q}_1(n+1)$

, ..., $\hat{Q}_k(n+1)$, they are generated by directly equalizing and slicing the data signals $Q_1(n+1)$, ..., $Q_k(n+1)$ with the corresponding equalizers 114a, ..., 124a and slicers 94b, ..., 104b.

It should be noted that the symbol Q(.) represents the received data signal of the corresponding sub-carrier and the symbol $\hat{Q}(.)$ represents the result of equalizing and slicing of the data signal of Q(.).

With the circuit configuration shown in FIG. 2, the correlation values $R_{pre}$ and $R_{nxt}$ are computed according to the following equations (3) and (4).

$$R_{pre} = \sum_{k=1}^{K} \text{abs}\left(E\left[\hat{Q}_k(n-1) \cdot Q_k(n)^*\right]\right) \quad \text{Equation (3)}$$

$$R_{nxt} = \sum_{k=1}^{K} \text{abs}\left(E\left[\hat{Q}_k(n+1) \cdot Q_k(n)^*\right]\right) \quad \text{Equation (4)}$$

$Q_k(n)^*$ denotes the conjugated data signal transmitted using an $n^{th}$ symbol via the a $k^{th}$ sub-carrier, $\hat{Q}_k(n-1)$ denotes the equalized comparison data signal transmitted using an $(n-1)^{th}$ symbol via a $k^{th}$ sub-carrier, and $\hat{Q}_k(n+1)$ denotes another equalized comparison data signal transmitted using an $(n+1)^{th}$ symbol via a $k^{th}$ sub-carrier.

Therefore, if the correlation value $R_{pre}$ is greater than the correlation value $R_{nxt}$, it means that the interference is mainly caused by the previous symbol, in this manner, the timing of the boundary is delayed by the timing controller 129. If the correlation value $R_{pre}$ is smaller than the correlation value $R_{nxt}$, it means that the interference is mainly caused by the next symbol, in this manner, the timing is advanced by the timing controller 129. In the end, the ISI effect is alleviated.

It is well-known that the ISI might be introduced by adjacent sub-carriers as well. That is, inter-carrier-symbol-interference (ICSI) occurs. Please refer to FIG. 3, which is a schematic diagram of an ICSI detector 160 according to the third embodiment of the present invention. In this embodiment, k sub-carriers of the different symbols for transmitting data are chosen through decision directed method for determining ISI. Since the data of two different sub-carriers are different, the correlation between the data of different sub-carriers is due to the interference between these two sub-carriers.

The ICSI detector 160 has two correlators 130, 150 and a comparator 170. The correlator 130 includes conjugating units 131, ..., 141, equalizers 132a, 132b, ..., 142a, 142b, slicers 132c, 132d, ..., 142c, 142d, multipliers 133a, 133b, ..., 143a, 143b, low-pass filters 134a, 134b, ..., 144a, 144b, absolute value calculating units 136a, 136b, ..., 146a, 146b, and a summation unit 138. Similarly, the correlator 150 includes conjugating units 151, ..., 161, equalizers 152a, 152b, ..., 162a, 162b, slicers 152c, 152d, ..., 162c, 162d, multipliers 153a, 153b, ..., 163a, 163b, low-pass filters 154a, 154b, ..., 164a, 164b, absolute value calculating units 156a, 156b, ..., 166a, 166b, and a summation unit 158.

It is obvious that the correlators 130, 150 have substantially the same circuit architecture. However, the data inputted into the correlators 130, 140 are different. Please note that the components shown in FIGS. 1, 2, and 3 that have the same name have substantially the same functionality and operation. The related description, therefore, is not repeated for simplicity. The following equations (5) and (6) are used to better explain operations of the correlators 130 and 150.

$$R_{pre} = \sum_{k=1}^{K} \left( \begin{array}{l} \text{abs}\left(E\left[\hat{D}_{k-1}(n-1) \cdot D_k(n)^*\right]\right) + \\ \text{abs}\left(E\left[\hat{D}_{k+1}(n-1) \cdot D_k(n)^*\right]\right) \end{array} \right) \quad \text{Equation (5)}$$

$D_k(n)^*$ represents the conjugate of data $D_k(n)$ transmitted using an $n^{th}$ symbol via a $k^{th}$ sub-carrier, $\hat{D}_{k-1}(n-1)$ denotes a decision result of data $D_{k-1}(n-1)$ transmitted using an $(n-1)^{th}$ symbol via a $(k-1)^{th}$ sub-carrier and $\hat{D}_{k+1}(n-1)$ denotes a decision result of data $D_{k+1}(n-1)$ transmitted using an $(n-1)^{th}$ symbol via a $(k+1)^{th}$ sub-carrier. As a result, the correlation value $R_{pre}$ is computed to estimate the magnitude of ICSI imposed upon the data $D_k(n)$. That is, the ICSI generated from the adjacent $(k-1)$th sub-carrier and $(k+1)^{th}$ sub-carrier using a previous symbol is calculated according to the above Equation (5).

$$R_{nxt} = \sum_{k=1}^{K} \left( \begin{array}{l} \text{abs}\left(E\left[\hat{D}_{k-1}(n+1) \cdot D_k(n)^*\right]\right) + \\ \text{abs}\left(E\left[\hat{D}_{k+1}(n+1) \cdot D_k(n)^*\right]\right) \end{array} \right) \quad \text{Equation (6)}$$

Figure 3:
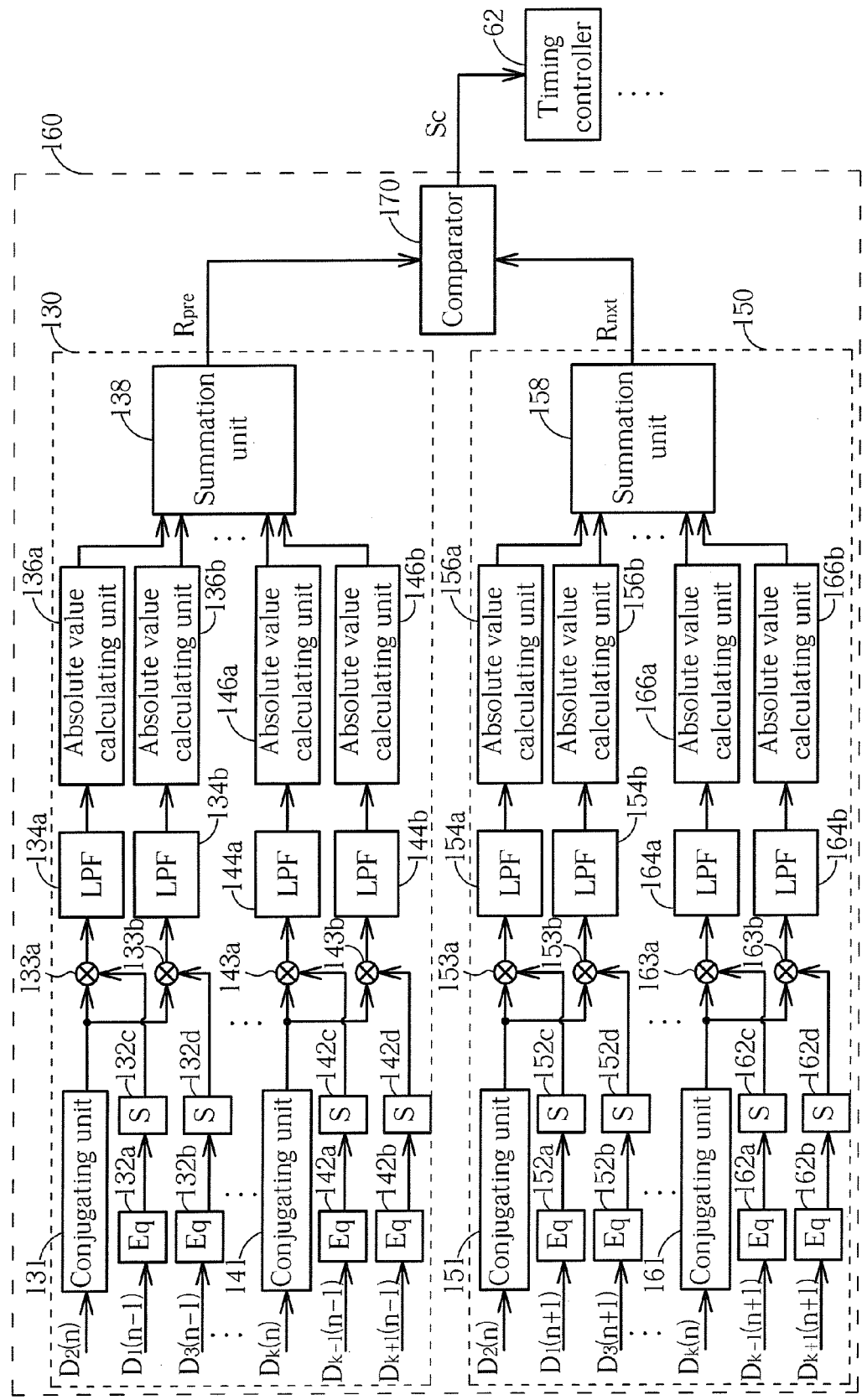
FIG. 3 is a schematic diagram of an ICSI detector according to an embodiment of the present invention.

$D_k(n)^*$ represents the conjugate of data $D_k(n)$ transmitted using an $n^{th}$ symbol via a $k^{th}$ sub-carrier, $\hat{D}_{k-1}(n+1)$ denotes a decision result of data $D_{k-1}(n+1)$ transmitted using an $(n+1)^{th}$ symbol via a $(k-1)^{th}$ sub-carrier, and $\hat{D}_{k+1}(n+1)$ denotes a decision result of data $D_{k+1}(n+1)$ transmitted using an $(n+1)^{th}$ symbol via a $(k+1)^{th}$ sub-carrier. It is clear that the correlation value $R_{nxt}$ is also computed to estimate the magnitude of ICSI imposed upon the data $D_k(n)$. In other words, the ICSI generated from the adjacent $(k-1)$th sub-carrier and $(k+1)^{th}$ sub-carrier using a following symbol is calculated according to the above Equation (6). Please note that data processed by correlators 130 and 150 are transmitted via data sub-carriers not pilot sub-carriers. Finally, the comparator 170 shown in FIG. 3 compares the correlation value $R_{pre}$ with the correlation value $R_{nxt}$ for searching a greater one. If the correlation value $R_{pre}$ is greater than the correlation value $R_{nxt}$, it means that the interference is mainly caused by the previous symbol, in this manner, the timing of the boundary would be delayed by the timing controller 172. If the correlation value $R_{pre}$ is smaller than the correlation value $R_{nxt}$, it means that the interference is mainly caused by the next symbol, in this manner, the timing of the boundary of the OFDM system would be advanced by the timing controller 172. Therefore, the ICSI effect is alleviated.

In the above embodiments, please note the absolute values are directly summed to generate the wanted correlation values $R_{pre}$ and $R_{nxt}$. However, the correlation values $R_{pre}$ and $R_{nxt}$ can be generated by using square values instead of the absolute values. For instance, each of the product values is squared before the summation value is calculated. That is, the above Equations (1)-(6) are replaced with the following equations, respectively.

$$R_{pre} = \sum_{k=1}^{K} \left( E\left[ \hat{P}_k(n-1) \cdot P_k(n)^* \right] \right)^2 \qquad \text{Equation (1.1)}$$

$$R_{nxt} = \sum_{k=1}^{K} \left( E\left[ \hat{P}_k(n+1) \cdot P_k(n)^* \right] \right)^2 \qquad \text{Equation (2.1)}$$

$$R_{pre} = \sum_{k=1}^{K} \left( E\left[ \hat{Q}_k(n-1) \cdot Q_k(n)^* \right] \right)^2 \qquad \text{Equation (3.1)}$$

$$R_{nxt} = \sum_{k=1}^{K} \left( E\left[ \hat{Q}_k(n+1) \cdot Q_k(n)^* \right] \right)^2 \qquad \text{Equation (4.1)}$$

$$R_{pre} = \sum_{k=1}^{K} \left( \begin{array}{l} \left( E\left[ \hat{D}_{k-1}(n-1) \cdot D_k(n)^* \right] \right)^2 + \\ \left( E\left[ \hat{D}_{k+1}(n-1) \cdot D_k(n)^* \right] \right)^2 \end{array} \right) \qquad \text{Equation (5.1)}$$

$$R_{nxt} = \sum_{k=1}^{K} \left( \begin{array}{l} \left( E\left[ \hat{D}_{k-1}(n+1) \cdot D_k(n)^* \right] \right)^2 + \\ \left( E\left[ \hat{D}_{k+1}(n+1) \cdot D_k(n)^* \right] \right)^2 \end{array} \right) \qquad \text{Equation (6.1)}$$

The method and related device disclosed in the embodiments of the present invention for detecting ISI/ICSI in an OFDM system for adjusting a boundary of the OFDM system first computes correlation values to predict the source of the ISI/ICSI and then adjusting the boundary after the source of the ISI/ICSI is determined. Therefore, the performance of tracking the boundary of the OFDM system is greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting inter-symbol interference (ISI) and accordingly improving a timing of a detected boundary used for processing a plurality of different symbols, wherein the plurality of different symbols comprise a previous symbol, a current symbol and a following symbol and each of them is composed of a plurality of signals which are respectively transmitted via a plurality of sub-carriers in an OFDM system, the method comprising:

utilizing a first correlator for computing a first correlation value according to a specific signal of the current symbol and a specific signal of the previous symbol, the step of computing the first correlation value comprising:
  computing a plurality of first conjugated values according to the specific signal of the current symbol;
  generating a plurality of first product values according to the first conjugated values and the specific signal of the previous symbol;
  generating a plurality of first calculation values with the same sign according to the first product values; and
  generating the first correlation value according to a summation of the first calculation values;

utilizing a second correlator for computing a second correlation value according to the specific signal of the current symbol and a specific signal of the following symbol, wherein the specific signals of the previous, current and following symbols are transmitted via the same sub-carrier;

utilizing a comparator for comparing the first correlation value with the second correlation value to determine whether the first correlation value is larger than the second correlation value; and utilizing a timing controller for delaying the timing of the detected boundary when the first correlation value is larger than the second correlation value due to the timing of the detected boundary being ahead of the timing of an ideal boundary, and advancing the timing of the detected boundary when the second correlation value is larger than the first correlation value due to the timing of the detected boundary lagging behind the timing of the ideal boundary.

2. The method of claim 1, wherein the specific signals of the previous, current and following symbols are pilot signals.

3. The method of claim 1, wherein the specific signals of the previous, current and following symbols are data signals.

4. The method of claim 1, wherein the first calculation values are absolute values.

5. The method of claim 1, wherein the first calculation values are square values.

6. The method of claim 1, wherein the step of computing the second correlation value comprises:
  computing a plurality of second conjugated values according to the specific signal of the current symbol;
  generating a plurality of second product values according to the second conjugated values and the specific signal of the following symbol;
  generating a plurality of second calculation values with the same sign according to the second product values; and
  generating the second correlation value according to the summation of the second calculation values.

7. The method of claim 6, wherein the second calculation values are absolute values.

8. The method of claim 6, wherein the second calculation values are square values.

9. An apparatus for detecting inter-symbol interference (ISI) and accordingly improving a timing of a detected boundary used for processing a plurality of different symbols, wherein the plurality of different symbols comprise a previous symbol, a current symbol and a following symbol and each of them is composed of a plurality of signals which are respectively transmitted via a plurality of sub-carriers in an OFDM system, the apparatus comprising:

a first correlator for computing a first correlation value according to a specific signal of the current symbol and a specific signal of the previous symbol, the first correlator comprising:
  a first conjugating circuit for computing a plurality of first conjugated values according to the specific signal of the current symbol;
  a multiplying circuit for generating a plurality of first product values according to the first conjugated values and the specific signal of the previous symbol;
  a first calculating circuit for generating a plurality of first calculation values with the same sign according to the first product values; and
  a first summation circuit for generating the first correlation value according to the first calculation values;

a second correlator for computing a second correlation value according to the specific signal of the current symbol and a specific signal of the following symbol, wherein the specific signals of the previous, current and following symbols are transmitted via the same sub-carrier;

a comparator for comparing the first correlation value with the second correlation value to determine whether the first correlation value is larger than the second correlation value; and a timing controller for delaying the timing of the detected boundary when the first correlation value is larger than the second correlation value due to the timing of the detected boundary being ahead of the timing of an ideal boundary, and advancing the timing of the detected boundary when the second correlation value is larger than the first correlation value due to the timing of the detected boundary lagging behind the timing of the ideal boundary.

10. The apparatus of claim 9, wherein the specific signals of the previous, current and following symbols are pilot signals.

11. The apparatus of claim 9, wherein the specific signals of the previous, current and following symbols are data signals.

12. The apparatus of claim 9, wherein the first calculation values are absolute values.

13. The apparatus of claim 9, wherein the first calculation values are square values.

14. The apparatus of claim 9, wherein the second correlator further comprises:
a conjugating circuit for computing a plurality of second conjugated values according to the specific signal of the current symbol;
a multiplying circuit for generating a plurality of second product values according to the second conjugated values and the specific signal of the following symbol;
a second calculating circuit for generating a plurality of second calculation values with the same sign according to the second product values; and
a second summation circuit for generating the second correlation value according to the second calculation values.

15. The apparatus of claim 14, wherein the second calculation values are absolute values.

16. The apparatus of claim 14, wherein the second correlation values are square values.

17. An apparatus for detecting inter-symbol interference (ISI) and accordingly improving a timing of a detected boundary used for processing a plurality of different symbols, wherein the plurality of different symbols comprise a previous symbol, a current symbol and a following symbol and each of them is composed of a plurality of signals which are respectively transmitted via a plurality of sub-carriers in an OFDM system, the apparatus comprising:

a first correlator for computing a first correlation value according to a specific signal of the current symbol and a specific signal of the previous symbol;

a first equalizing circuit for equalizing the specific signal of the previous symbol;

a first slicing circuit for slicing the equalized specific signal of the previous symbol and providing a first sliced signal for the first correlator, wherein the first correlator computes the first correlation value according to the first sliced signal and the specific signal of the current symbol;

a second correlator for computing a second correlation value according to the specific signal of the current symbol and a specific signal of the following symbol, wherein the specific signals of the previous, current and following symbols are transmitted via the same sub-carrier;

a second equalizing circuit for equalizing the specific signal of the following symbol;

a second slicing circuit for slicing the equalized specific signal of the following symbol and providing a second sliced signal for the second correlator, wherein the second correlator computes the second correlation value according to the second sliced signal and the specific signal of the current symbol;

a comparator for comparing the first correlation value with the second correlation value to determine whether the first correlation value is larger than the second correlation value; and a timing controller for delaying the timing of the detected boundary when the first correlation value is larger than the second correlation value due to the timing of the detected boundary being ahead of the timing of an ideal boundary, and advancing the timing of the detected boundary when the second correlation value is larger than the first correlation value due to the timing of the detected boundary lagging behind the timing of the ideal boundary.

* * * * *